United States Patent [19]

Coulange

[11] 4,454,761
[45] Jun. 19, 1984

[54] LIQUID LEVEL DETECTOR ADAPTED IN PARTICULAR TO DETERMINE THE LEVEL OF FUEL IN A VEHICLE FUEL TANK

[75] Inventor: Jean Coulange, Conflans Sainte-Honorine, France

[73] Assignee: e.d. Veglia, France

[21] Appl. No.: 273,749

[22] Filed: Jun. 15, 1981

[30] Foreign Application Priority Data

Jun. 19, 1980 [FR] France .................. 80 13586

[51] Int. Cl.³ ............................................ G01F 23/06
[52] U.S. Cl. ........................................ 73/308; 73/305; 73/306
[58] Field of Search .................. 73/305, 306, 308, 313; 200/84 R, 84 A, 61.2, 61.21, 276, 245; 340/608; 267/158, 165

[56] References Cited

U.S. PATENT DOCUMENTS 1,395,132 10/1921 McKissick ................. 200/84 R
2,899,517 8/1959 Hastings ..................... 116/228

FOREIGN PATENT DOCUMENTS 2900413 7/1979 Fed. Rep. of Germany ........ 73/313

Primary Examiner—Charles Frankfort
Assistant Examiner—David R. Schuster
Attorney, Agent, or Firm—Jacobs & Jacobs

[57] ABSTRACT

In a liquid level detector of the type comprising a fixing rod bearing a winding over virtually the whole of its height, an annular float mounted around the rod and bearing at least one conducting blade constantly in contact with the winding, a warning device comprising a conducting rod sliding in a bore made in the float, the bore having its axis substantially parallel to the axis of the fixed rod, the conducting rod comprising a retaining device, and a conducting surface fixed to the lower end of the fixed rod, the arrangement being such that the conducting rod projects downwardly from the float when the level is higher than a determined warning level and comes into contact with the conducting surface when this level is reached, and electrical connections connecting the winding, the conducting surface, the or each conducting blade and the conducting rod to output terminals, the conducting rod extends at its top end in a supple loop made of conducting wire located in a plane substantially perpendicular to the axis of the float and of which the end opposite the conducting rod is fixed on a conducting piece itself fixed on the float and connected to the or each conducting blade in contact with the winding.

3 Claims, 3 Drawing Figures

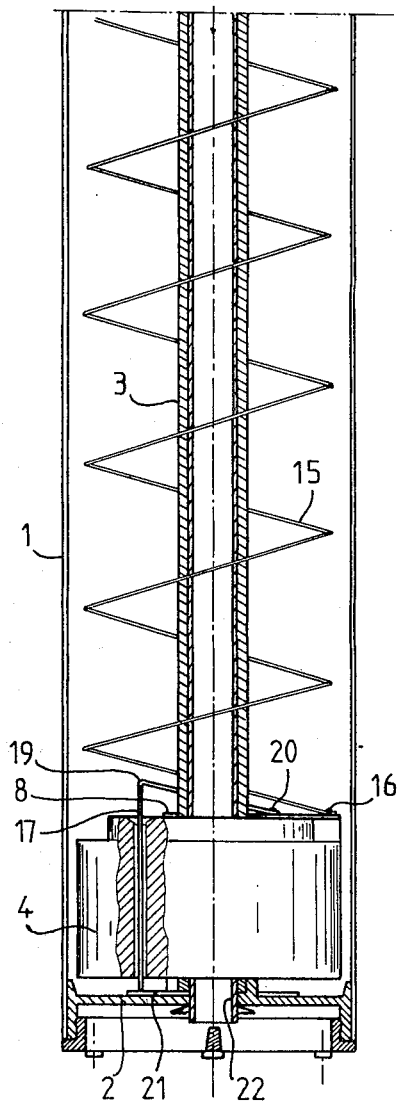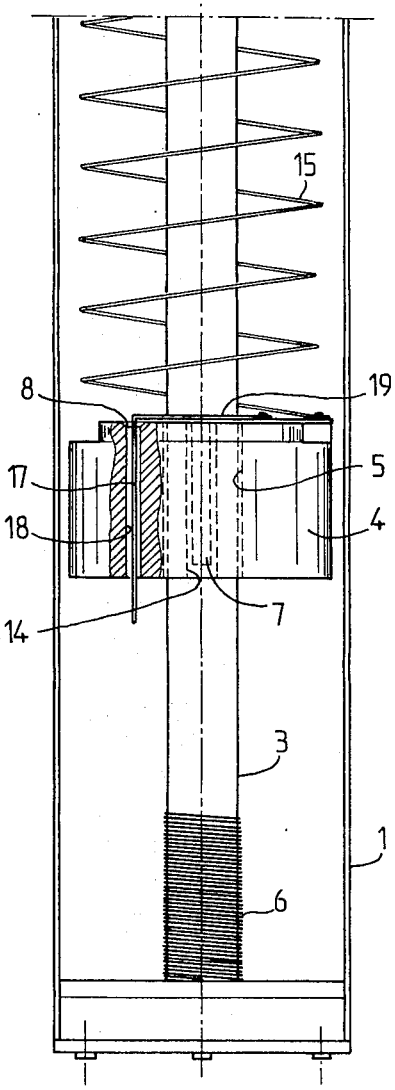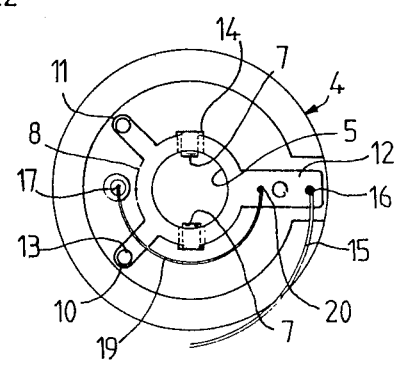

LIQUID LEVEL DETECTOR ADAPTED IN PARTICULAR TO DETERMINE THE LEVEL OF FUEL IN A VEHICLE FUEL TANK

The invention relates to a liquid level detector adapted in particular to determine the level of fuel in a vehicule fuel tank and further to give the alert when the level reaches a determined value.

It appears desirable to draw the driver's attention, for example by means of an indicator light, when the level of fuel reaches a determined minimum value corresponding to a given cruising radius for the vehicle. The mere indication of the level, for example by means of a needle or other display element, may in fact be considered as insufficient in this respect.

French Patent Application No. 2 414 191 describes a liquid level detector of the type comprising a fixed rod bearing a winding over virtually the whole of its height, an annular float mounted around the rod and bearing at least one conducting blade constantly in contact with said winding, warning means comprising a conducting rod sliding in a bore made in the float, said bore having its axis substantially parallel to the axis of the fixed rod, the conducting rod comprising a retaining means, and a conducting surface fixed to the lower end of the fixed rod, the arrangement being such that the conducting rod projects downwardly from the float when the level is higher than a determined warning level and comes into contact with the conducting surface when this level is reached, and electrical connections connecting the winding, the conducting surface, the or each conducting blade and the conducting rod to output terminals.

In this known device, the position of the float controls the resistance of the winding, this enabling the level of liquid to be determined. Furthermore, the warning means are designed in order not to interfere with the level detecting means, in that the contact between the conducting rod and the conducting surface, which is established from the warning level, does not prevent the float from continuing to descend when the level goes below the warning level.

In the embodiment disclosed by the above-mentioned patent application, the conducting rod bears at its top end a lug forming retaining means and the bore receiving the conducting rod comprises a widened portion in which is housed a conducting helical element connecting the lower end of the conducting rod to a contact placed on the bottom of said widened portion, which contact is connected to the same connection as the conducting blades of the float.

An embodiment of this type is relatively complicated. In particular, the assembly of the conducting helical element is a very delicate operation.

It is an object of the present invention to provide much simpler and more convenient warning means.

According to the invention, the conducting rod extends at its top end in a supple loop made of conducting wire located in a plane substantially perpendicular to the axis of the float and of which the end opposite the conducting rod is fixed on a conducting piece itself fixed on the float and connected to the or each conducting blade in contact with said winding.

The loop of conducting wire thus simultaneously performs the functions of electrical connection and of retention of the conducting rod whilst allowing, due to its suppleness, a relative displacement between the float and the conducting rod when the level descends beyond the warning level. The resulting deformation of the loop is elastic, with the result that the loop advantageously effects a return force which opposes the displacement of the conducting rod with respect to the float.

The single element of metal wire which constitutes the conducting wire and the loop obviously represents a structure which is much simpler and more economical than the means provided in the above-mentioned patent application.

Assembly consists simply in engaging the portion constituting the conducting rod in the bore made in the float and in welding the end of the loop opposite the rod to the conducting tongue bearing the contact blades.

The invention will be more readily understood on reading the following description with reference to the accompanying drawings, in which:

FIG. 1 shows a level detector according to the invention in a position corresponding to a level higher than the warning level.

FIG. 2 corresponds to the case of the level being lower than the warning level, certain parts being seen in section.

FIG. 3 shows the float of FIGS. 1 and 2 in plan view.

Referring now to the drawings, the fuel level detector for the fuel tank of a vehicle shown therein, comprises an outer tube 1 provided with a bottom 2 and a cover (not shown), a guide rod 3 placed along the axis of the tube 1 and fixed to the bottom and to the cover of the tube, and a float 4 placed inside the tube and provided with a central opening 5 through which the guide rod 3 passes.

The tube 1 comprises a hole (not shown) located a little above the level of the bottom 2, which enables the fuel to penetrate inside the tube. However, this hole is sufficiently small for the tube effectively to perform the role of "anti-wave" device.

The guide rod 3 bears over the whole height of its outer surface a winding 6 made of conducting wire, shown only partially in FIG. 1. This winding 6 is in sliding contact with two conducting blades 7 borne by the float, which project internally with respect to the central opening 5.

The blades 7, as shown more clearly in FIG. 3, constitute the extensions of a conducting piece 8, generally in the form of a ring placed on the top of the float which extends in three radial tongues 10, 11, 12 fixed to the float by rivets 13. The blades 7 are received in notches 14 formed in the inner wall of the float.

The conducting ring 8 is connected to an output terminal, fixed to the cover of the tube and not shown in the drawings, by a supple helical element 15 of metal wire, of which the end 16 is welded on the tongue 12.

The winding 6 is also connected by its top end to an output terminal. The float 4 also performs the role of a potentiometer slider and its position, defined by the level of the fuel, controls the resistance of the winding. Measurement of this resistance therefore enables the level of fuel to be determined and suitable means, which do not need to be described here, are provided for displaying this information on the dashboard of the vehicle.

A warning device is further provided which lights up an indicator light on the dashboard of the vehicle when the level of fuel falls to a determined warning level. This device comprises a rod 17 made of conducting wire, sliding freely in a bore 18 formed in the float 4 parallel to its axis. The rod 17 extends at its top end in a loop 19 forming an elbow with respect to the rod 17 and of which the end 20 is welded on the tongue 12, as shown in FIG. 3. The wire constituting the loop 19 and the rod 17 is fine, with the result that the loop is considerably supple, allowing the vertical displacement of the rod 17. On the other hand, the conducting rod 17 is longer than the bore 18 and therefore projects downwardly from the float in the case, illustrated in FIG. 1, of the level of fuel being higher than the warning level.

The warning device also comprises a conducting element 21 in the form of a ring, placed on the bottom 2 of the outer tube. The outer diameter of the element 18 is such that the lower end of the conducting rod 17 comes into contact therewith when the float is in sufficiently low position, as illustrated in FIG. 2. The element 21 surrounds and is in contact with a tube 22 made of conducting metal which constitutes the inner part of the guide rod 3, the latter being suitably made by extension of a plastics material around the metal tube 22. The tube 22 serves as electrical conductor in the warning circuit and is connected by its top end to an ouput terminal fixed on the cover of the tube 1 (not shown).

When the fuel level falls to a point where the conducting rod 17 comes into contact with the conducting element 21, the warning circuit closes and the indicator light lights up. As the conducting rod 17 slides freely with respect to the float, the latter may continue to descend if the fuel level drops further, so that the warning device does not affect the indication of the level. This is illustrated in FIG. 2 which shows the float in its lowest position. It is seen that the relative positions of the rod 17 and the float have changed with respect to the case of FIG. 1, the variation being absorbed by the suppleness of the loop 19.

It will be noted that the corresponding deformation of the loop 19 is an elastic deformation and that the loop exerts on the conducting wire a return force which tends to maintain the rod 17 in the lowest position with respect to the float. This function of return is important as the rod 17, formed by a fine wire, has a low natural weight. If there is no return action, it is possible that the rod 17 cannot return into its rest position of FIG. 1 when the float rises after a warning.

What is claimed is:

1. In a liquid level detector of the type comprising a fixed rod bearing a winding over virtually the whole of its height, an annular float mounted around the rod and bearing at least one conducting blade constantly in contact with said winding, warning means comprising a conducting rod sliding in a bore made in the float, said bore having its axis substantially parallel to the axis of the fixed rod, the conducting rod comprising a retaining means, and a conducting surface fixed to the lower end of the fixed rod, the arrangement being such that the conducting rod has a normal position where said conducting rod projects downwardly from the float when the level is higher than a determined warning level and comes into contct with the conducting surface when this level is reached, and electrical connections connecting the winding, the conducting surface, the conducting blade and the conducting rod to output terminals, the improvement wherein the conducting rod terminates at its top end in a supple loop made of conducting wire located in a plane substantially perpendicular to the axis of the float, the free end of said loop opposite the conducting rod being fixed on a conducting piece itself fixed on the float and connected to the conducting blade in contact with said winding, said supple loop being operable to electrically connect said conducting rod to said conducting piece and further being operable to bias said conducting rod to its normal position when said float rises after a warning.

2. The detector of claim 1, wherein the conducting rod is made of the same wire as the loop.

3. The detector of claim 1, wherein two conducting blades are provided in contact with said winding and connecting to said conducting piece.

* * * * *